United States Patent [19]

Argent

[11] Patent Number: 5,360,242

[45] Date of Patent: Nov. 1, 1994

[54] PIPE CONNECTING ASSEMBLY AND METHOD FOR JOINING TWO LENGTHS OF STEEL PIPE BY A PRESS-FIT CONNECTION

[76] Inventor: Michael F. Argent, 7800 S. Rock Hill Rd., St. Louis, Mo. 63123

[21] Appl. No.: 958,011

[22] Filed: Oct. 7, 1992

[51] Int. Cl.$^5$ ........................................... A16L 25/00
[52] U.S. Cl. ................................. 285/330; 285/382; 285/921; 29/453; 29/525; 228/189; 405/184
[58] Field of Search ............... 285/382, 921, 330, 381, 285/382; 29/453, 525; 228/135, 138, 189; 405/184

[56] References Cited

U.S. PATENT DOCUMENTS

| | | |
|---|---|---|
| Re. 29,376 | 8/1977 | Hiszpanski . |
| 786,929 | 4/1905 | Williams . |
| 2,257,335 | 9/1941 | Evans et al. . |
| 3,074,292 | 1/1963 | Polmon . |
| 3,096,105 | 7/1963 | Risley . |
| 3,114,566 | 12/1963 | Coberly et al. ................. 285/381 X |
| 3,751,077 | 8/1973 | Hiszpanski . |
| 3,751,792 | 8/1973 | Frakes . |
| 3,774,296 | 11/1973 | Clay . |
| 4,124,232 | 11/1978 | Ahlstone ......................... 285/381 X |
| 4,214,358 | 7/1980 | Clerc . |
| 4,275,907 | 6/1981 | Hunt . |
| 4,298,221 | 11/1981 | McGugam ....................... 285/382 X |
| 4,341,481 | 7/1982 | Wollensak . |
| 4,728,236 | 3/1988 | Kraus . |
| 4,779,902 | 10/1988 | Lee . |
| 4,790,573 | 12/1988 | Cardozo . |
| 4,817,997 | 4/1989 | Ingram . |
| 4,865,359 | 9/1989 | Roberts ............................. 285/382 X |
| 4,919,461 | 4/1990 | Reynolds . |
| 5,015,014 | 5/1991 | Sweeney .......................... 285/921 X |

OTHER PUBLICATIONS

*Modern Plastics* article "Snap-Fit design concepts" by W. W. Chow dated Aug. 1977, pp. 56–59.
*Plastics Diesign Forum* article "Designing for snap fits, part 1" by Wuebken et al. dated May/Jun. 1984, pp. 37–40.
*Plastics Design Forum* "Designing for snap fits, part 2" by McIntyre et al. dated Jul./Aug. 1984, pp. 35–40.
*Plastics Design Forum* article "Designing for snap fits, part 3" by McIntyre et al. dated Sep./Oct. 1984, pp. 53–58.
Case Study—"Almost Instant Sewer Replacement at Blisworth" by Russell Smith, date unknown.
Seal Pipe advertisement for "The ' Snaplock'System of Sewer Renovation", date unknown.
Aardvark Corporation advertisement for BarbVark Quick Connect Pipe Joints, date unknown.
Phillips Driscopipe, Inc. brochure for Driscopipe 9100, copyrighted 1987.

*Primary Examiner*—Dave W. Arola
*Attorney, Agent, or Firm*—Rogers, Howell & Haferkamp

[57] ABSTRACT

A pipe connecting assembly and method for joining two lengths of steel pipe in the field without the need for welding the connection includes a pair of tubular members both having cylindrical exterior and interior surfaces that substantially conform to the exterior and interior surfaces of the two lengths of steel pipe. At one end of one of the tubular members a male connector is formed. The male connector has a plurality of annular flat and tapered ridges and flat annular surfaces formed thereon. At one end of the other tubular member a female connector is formed. The female connector has a plurality of flat annular ridges and tapered and flat surfaces forced thereon. In employing the tubular members in connecting the two lengths of steel pipe, the ends of the members opposite the male and female connectors are first welded to opposed ends of the steel pipe. The male connector is then press-fit into the female connector to connect the two lengths of steel pipe together without requiring the welding of the two lengths of pipe to each other. The apparatus and method enables the connectors to be welded to opposite ends of lengths of steel pipe in a welding shop where the welding operations are most efficiently performed. The lengths of steel pipe with the connectors of the invention attached may then be transported to a trenchless pipelaying excavation site where they are press-fit together in sequence without the need for welding at the pipelaying site.

19 Claims, 1 Drawing Sheet

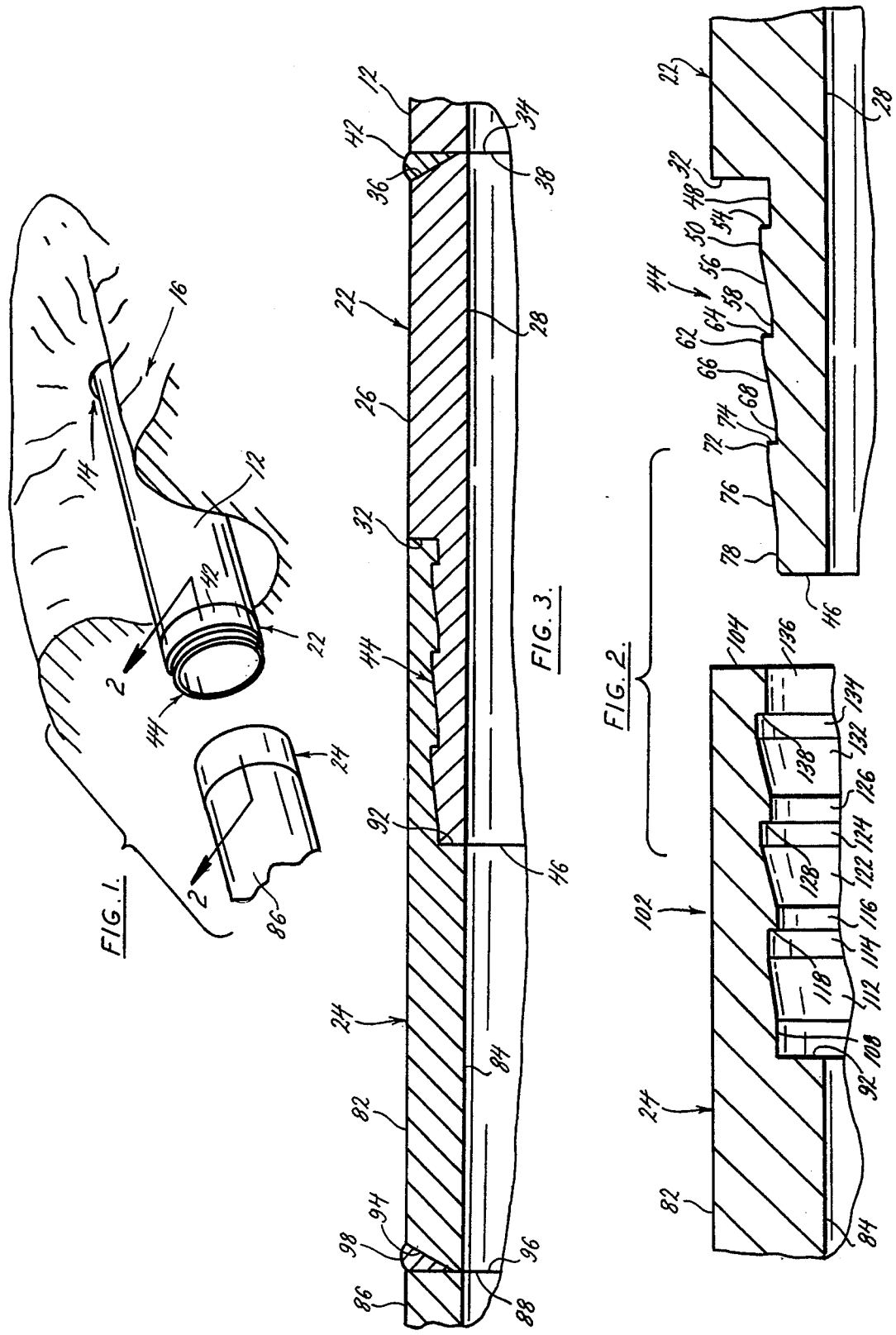

PIPE CONNECTING ASSEMBLY AND METHOD FOR JOINING TWO LENGTHS OF STEEL PIPE BY A PRESS-FIT CONNECTION

BACKGROUND OF THE INVENTION (1) Field of the Invention

The present invention relates to a pipe connecting assembly and method for Joining two lengths of steel pipe in the field by a press-fit connection, the assembly and method employing a pair of steel connectors welded to or machined on opposed ends of the joined pipes.

(2) Description of the Related Art

Today, in the United States alone, there is a need to repair, replace, and generally upgrade the existing infrastructure of many communities and rural areas. Some cost estimates of the needed repairs and replacements range as high as 2 trillion dollars. Underground utility systems such as water, sewer, gas and electric or fiber optic lines make up a large and important part of this needed upgrading.

In replacing or upgrading existing underground pipeline utility systems, the traditional construction methods of open cut or trenching pipelaying may be employed. However, these methods are disruptive and costly to society, particularly in densely populated areas. Moreover, open cut or trenching construction methods of pipelaying are often prohibited in environmentally sensitive areas such as wetlands and in existing right-of-ways like highways and railroads.

Expansion, repair and replacement of underground infrastructure, particularly in urban and environmentally sensitive areas, creates the need for trenchless solutions. Trenchless methods offer many inherent advantages over traditional trenching methods and are becoming more cost effective with the ongoing development of these methods and equipment. In recent years, organizations such as the North American Society for Trenchless Technology and The American Underground Space Association have been formed. One purpose of these organizations is to increase the public awareness of trenchless methods of constructing pipelines which do not require an open cut or trench for laying pipeline and minimize the social disruption and environmental impact often associated with the traditional methods of underground utility construction. New technologies developed in other parts of the world are being introduced into the United States and Canada to meet the growing concern for the social costs and disruption of urban environments associated with traditional trenching methods of laying pipeline.

Trenchless excavation construction (T.E.C.) methods and equipment often require the use of lengths of steel pipe, because of its great compressive strength, as an encasement for underground water or sewer lines being installed. Designers of underground pipelines typically prefer using steel pipe casings because they are readily available, they are reasonably priced, and the steel pipeline casing is a forgiving material having a unique ability to bend or deflect while still offering full resistance to compression or tension loads. Steel casings are often provided around fluid transporting pipelines as a safety precaution to channel flow under highways and railroad tracks to prevent the possibility of soil erosion in these right-of-ways in the event of a carrier pipe leak or failure within the steel casing.

Most T.E.C. equipment and methods currently employed are designed to advance a series of connected lengths of steel casing pipe horizontally through the ground as a horizontal hole for the pipe is bored by the T.E.C. equipment. A significant problem that is most commonly encountered in T.E.C. methods of laying steel pipeline is the extent to which the forward progression of connected lengths of steel pipe pushed through the horizontal hole must be stopped for a period of time in order to weld an additional length of pipe to the series of connected pipes. The crew and equipment must stop to wait for the next length of pipeline to be attached. It is conservatively estimated that the productivity of a T.E.C. project could be increased by 25% to 50% if the welding operation time for Joining two adjacent lengths of steel pipe was eliminated. In order to eliminate the need for welding adjacent lengths of pipe a steel pipe joint connection that does not require welding and which fully meets the requirements of trenchless excavation pipelaying applications is needed.

To be employed in T.E.C. methods of laying steel pipeline, a steel pipe joint connection must be designed to meet the following requirements:

a) The joint connection must be able to withstand extremely large thrust or compression forces exerted by T.E.C. equipment without deforming or leaking. The nature of the trenchless installation method requires hydraulic thrust or compression forces to be exerted by the T.E.C. equipment to advance the sequentially connected lengths of steel pipeline horizontally through the bored hole. Extended distances of the bored hole and/or compacting soil conditions require proportionately increased thrust or compression forces to be exerted on the sequential lengths of connected pipe that steel pipe can best withstand at affordable costs.

b) The joint connection between adjacent lengths of pipe must present a substantially smooth and continuous surface with the exterior surface of adjacent lengths of pipe to minimize the friction forces that act against the sequential lengths of pipe being pushed through the horizontally bored hole and to minimize the void or open space between the exterior surfaces of the lengths of pipe and the interior walls of the bored hole to avoid significant ground surface settling above the bored pipeline hole. It is an objective of trenchless excavation to displace only as much soil from the horizontally bored hole as the sequential lengths of pipe will take up when inserted through the hole to prevent ground surface settlement.

c) When utilizing sequential lengths of steel pipe as a casing pipeline containing other conductors such as water, sewer, and gas pipelines and electrical or fiber optic cables, it is necessary that the joint connection between adjacent lengths of casing pipe be substantially smooth and continuous with the interior surfaces of the casing pipe to enable the easy threading of carrier pipeline or cable through the interior of the sequentially connected casing pipeline. A smooth and continuous joint between the interior surfaces of adjacent connected pipes is also necessary when the pipeline is used as a fluid conductor to avoid producing unwanted turbulence or cavitation in the fluid flowing through the pipeline.

d) At times when an obstruction such as a bolder is encountered when boring the horizontal pipeline hole, it becomes necessary to pull the sequentially connected lengths of pipe backwards through the bored hole for necessary corrections before forward progress can be continued. Therefore, the joint connection between adjacent lengths of steel pipe must be able to withstand extremely large tension forces without being pulled apart or forming leaks.

e) The joint connection between adjacent lengths of steel pipe must be fluid tight and/or hold internal pressures which may exceed 200 pounds per square inch; if it is to function as a carrier pipe.

f) The joint connection between adjacent lengths of steel pipe must be able to transmit bending loads or moments across the connection between adjacent lengths of pipe to the extent that the adjacent lengths of pipe bend as one. T.E.C. equipment is capable of directional changes, so must be the connection.

SUMMARY OF THE INVENTION

The steel pipe connecting assembly and method for Joining two lengths of steel pipe of the present invention satisfy a long felt need of the pipelaying industry by meeting all of the requirements of a steel pipe connecting assembly and method set forth above.

The pipe connecting assembly of the present invention is basically comprised of a pair of tubular steel members that are joined to the opposite ends of lengths of steel pipe and enable the lengths of steel pipe to be press-fit together in series at the sight of the excavation for laying the pipeline in a trench or for pushing the connected lengths of pipeline through a bore hole in T.E.C. pipeline methods. The ability to connect sequential lengths of pipe with the connecting assembly of the invention eliminates the time and equipment required for welding lengths of steel pipe together at the pipelaying sight and results in a substantial reduction in the costs of laying steel pipeline.

The two tubular steel members of the present invention are formed with exterior and interior diameters that are substantially equal to the exterior and interior diameter measurements of the steel pipe to which they are to be joined. One end of each of the tubular members is formed with a beveled edge to facilitate its welding connection to one end of a length of steel pipe. The opposite ends of the tubular members have connectors formed thereon with one member of each pair having a male connector formed on its opposite end and the other member of the pair having a female connector formed on its opposite end.

The male connector has a series of annular tapered ridges formed over its exterior surface. An annular, radially extending wall is formed on the exterior surface between adjacent ridges. An additional annular, radially extending wall is formed on the exterior surface adjacent to its connection to the tubular steel member.

The female connector has a series of annular tapered ridges formed on its interior surface. An annular, radially extending wall is formed on the interior surface between adjacent ridges. An additional annular, radially extending wall is formed on the interior surface adjacent its connection to the tubular steel member.

Each pair of tubular steel members is designed to be welded to opposite ends of a length of steel pipe or tubing in a welding shop prior to their being transported to the pipeline construction sight. The lengths of steel pipe with their attached connectors are then transported to the construction sight to be connected in series in trenching pipelaying operations, or preferably in T.E.C. pipelaying. In T.E.C. pipelaying, as a length of steel pipe is advanced through the horizontal hole bored according to conventional T.E.C. methods, the next length of steel pipe with the connectors of the assembly attached is positioned longitudinally adjacent the length of pipe last inserted into the hole and is then press-fitted to the mating connector attached to the projecting end of that length of pipe either by the T.E.C. equipment or by independent specially designed tools. The two joined pipes are then pushed further into the bore hole as the T.E.C. hole boring machinery advances. The next length of steel pipe with the connectors attached is then positioned longitudinally adjacent the projecting end of the steel pipe last pushed into the bore hole and the process is continued.

By providing the tubular steel members of the present invention that are attached to opposite ends of lengths of steel pipe at a welding shop and are then transported to a pipelaying construction sight where they are press-fit together in series as the pipe is advanced through a trenchless bore hole or laid along a trench excavation, the step of on-site field welding of adjacent pipe lengths together currently employed in pipelaying operations is eliminated and a significant savings in time and expense in pipelaying operations is achieved.

BRIEF DESCRIPTION OF THE DRAWINGS

Further objects and features of the present invention are revealed in the following detailed description of the preferred embodiment of the invention and in the drawing figures wherein:

FIG. 1 is a perspective view illustrating one operative environment of the pipe connecting assembly and method of the present invention;

FIG. 2 is a partial in section view showing the details of the male and female connectors of the tubular members of the invention taken along the line 2—2 of FIG. 1; and FIG. 3 is a partial sectioned view showing two lengths of steel pipe joined together by the connecting assembly of the present invention.

DESCRIPTION OF THE PREFERRED EMBODIMENT

FIG. 1 shows one operative environment of the pipe connecting assembly and method of the present invention. In FIG. 1, a length of steel pipe 12 is shown being inserted into a horizontal hole 14 drilled through the ground 16. This environment is representative of conventional T.E.C. methods of pipelaying. It should be understood that this preferred environment of the invention is only one environment in which the invention may be employed. The invention may also be employed in connecting sequential lengths of steel pipe to be laid in a pipelaying trench or vertically as a load bearing pipe pile.

The connecting assembly of the present invention is basically comprised of first 22 and second 24 tubular steel members. The tubular members are preferably constructed of the same type of carbon steel, but may also be constructed of various grades of steel including stainless steel. By being constructed entirely of steel the members 22, 24 are capable of withstanding the large compression and tension forces exerted by T.E.C. equipment.

The first tubular steel member 22 has a cylindrical exterior surface 26 and a cylindrical interior surface 28, the interior surface 28 defining a cylindrical bore through the center of the member between its left 32 and right hand 34 ends as viewed in the drawing figures. As is best seen in FIG. 3, the exterior and interior diameter dimensions of the tubular member 22 are chosen to substantially conform with the exterior and interior diameters of the length of steel pipe 12 to which it is to be joined. When the pipe connecting assembly of the invention is employed with lengths of pipe having different diameter dimensions, the diameter dimensions of the tubular members will be likewise changed to conform with those of the steel pipe.

The right hand end 34 of the first tubular member 22 has an annular beveled surface 36 formed thereon. As seen in FIG. 3, the beveled surface 36 facilitates the connection of the tubular member right hand end 34 to the end 38 of the length of steel pipe 12 by a weld 42.

The left hand end of the first tubular member 22 has a male connector 44 formed integrally thereon. The male connector 44 extends axially to the left as viewed in the drawing figures from the left end 32 of the tubular member 22 to the distal end 46 of the male connector. As can be seen in the drawing figures, a plurality of flat and tapered annular ridges and a plurality of flat annular surfaces are formed on the exterior surface of the male connector 44. The radial extensions of each of the ridges from the flat surfaces of the connector are all different, giving the exterior surface of the connector a plurality of different exterior diameter dimensions.

Beginning from the left end 34 of the first tubular member 22 and moving to the left over the exterior surface of the connector 44, a flat annular surface 48 is first formed on the exterior surface. An annular ridge 52 is formed on the exterior surface of the male connector 44 to the left of the annular surface 48. The ridge 52 has a larger diameter than the surface 48 and its radially outward projection from the exterior surface of the connector 44 forms an annular, radially extending wall 54 that opposes the left end 32 of the first tubular member 22. The annular ridge 52 also has a flat exterior surface raised above the surface 48 due to its larger diameter dimension. To the left of the flat annular ridge 52 is a tapered annular ridge 56. The tapered ridge 56 tapers toward the center axis of the tubular member 22 and connector 44 as it extends to the left from the annular ridge 52. The leftward slope of the tapered ridge 56 terminates as it meets a second flat annular surface 58 formed on the exterior of the male connector 44. Immediately to the left of the flat annular surface 58 is a flat annular ridge 62 having a larger diameter than the flat surface 58 and projecting radially outward from the flat surface 58, thereby forming a radially extending annular wall 64 between the flat ridge 62 and flat surface 58. The ridge 62 has a flat exterior surface and to the left of the flat ridge 62 is a second tapered annular ridge 66. As seen in the drawing figures, the tapered ridge 66 slopes toward the center axis of the male connector 44 and the first tubular member 22 as it extends to the left from the flat ridge 62. The tapered ridge 66 terminates at its left most end as it merges into a third flat annular surface 68. To the left of the flat annular surface 68 is a third flat annular ridge 72. The annular ridge 72 has a flat exterior surface at a diameter dimension from the center axis of the connector 44 and tubular member 22 that is greater than the diameter dimension of the flat annular surface 68. The difference in the diameters between the annular ridge 72 and the annular surface 68 forms a radially extending annular wall 74 between the ridge and surface. To the left of the flat annular ridge 72 is a third tapered annular ridge 76. As seen in the drawing figures, as the annular tapered ridge extends to the left from the flat annular ridge 72 it slopes toward the center axis of the connector 44 and the tubular member 22. The third tapered ridge 76 terminates as it merges into a fourth flat annular surface 78 formed over the exterior of the connector 44. The flat annular surface 78 extends leftward from the tapered ridge 76 to the distal end 46 of the connector 44.

Of the plurality of different diameter dimensions of the flat annular surfaces 48, 58, 68, 78; the flat annular ridges 52, 62, 72; and the tapered ridges 56, 66, 76; the flat annular surface 78 has the smallest exterior diameter dimension and the flat annular ridge 52 has the largest exterior diameter dimension. The exterior diameter dimensions of the flat annular surfaces 78, 68, 58 48, increase from left to right across the male connector 44. The exterior diameter dimensions of the flat annular ridges 72, 62, 52, increase from left to right across the connector 44. The exterior diameter dimensions of the tapered ridges 76, 66, 56 increase from left to right as they extend from the flat annular surfaces to the flat annular ridges on their opposite left and right sides, respectively.

The second tubular member 24 also has a cylindrical exterior surface 82 and a cylindrical interior surface 84 both having diameter dimensions that substantially conform to the diameter dimensions of the exterior and interior surfaces of the length of steel pipe 86 to which the tubular member 24 is to be connected. The cylindrical interior surface 84 of the tubular member 24 forms a tubular bore that extends axially through the center of the member from its left hand end 88 to its right hand end 92. A beveled surface 94 is formed on the left end 88 of the second tubular member 24 to facilitate its welding connection to the end 96 of the length of steel pipe 86. As seen in FIG. 3, the left end 88 of the tubular member 24 is welded to the end 96 of the steel pipe 86 by a weld 98.

The right-hand end 92 of the second tubular member 24 has a female connector 102 formed integrally thereon. The female connector extends axially to the right as viewed in the drawing figures from the right-hand end 92 of the tubular member 24 to the distal end 104 of the female connector. As can be seen in the drawing figures, a plurality of flat annular ridges and a plurality of flat and tapered annular surfaces are formed on the interior surface of the female connector. The radial extensions of each of the ridges from the interior surfaces toward the center axis of the connector are all different, giving the interior surface of the connector a plurality of different diameter dimensions.

Beginning from the right end 92 of the second tubular member 24 and moving to the right over the interior surface of the connector 102, a flat annular surface 108 is first formed on the interior surface of the female connector 102. A tapered annular surface 112 is formed on the interior surface of the female connector to the right of the flat annular surface 108. As the tapered surface 112 extends to the right from the flat surface 108, the interior diameter of the female connector increases. As seen in the drawing figures, the internal diameter of the tapered annular surface 112 increases as it extends to the right until it merges with a second flat annular surface 114. The second flat annular surface 114 has a larger internal diameter than the first flat surface 108. An internal annular ridge 116 is formed on the interior surface of the female connector to the right of the flat annular surface 114. The ridge 116 has a smaller interior diameter than the annular surface 114 and its projection from the interior surface of the connector 102 toward the connector center axis forms an annular, radially extending wall 118 that opposes the right end-wall 92 of the second tubular member 24. The annular ridge 116 also has a flat interior surface spaced inwardly from the flat annular surface 114 due to its smaller diameter dimension. To the right of the annular ridge 116 is a second annular tapered surface 122. The tapered surface 122 tapers away from the center axis of the female connector 102 as it extends to the right from the annular ridge 116. As the tapered surface 122 extends to the right its interior diameter increases until it merges with a third flat annular surface 124. Immediately to the right of the flat annular surface 124 is a second internal annular ridge 126 that projects from the interior surface of the female connector toward the center axis. The annular ridge 126 has a flat annular surface and a smaller interior diameter than the flat annular surface 124 forming an annular, radially extending wall 128 between the ridge 126 and the surface 124. Extending to the right from the annular ridge 126 is a third annular tapered surface 132. The internal diameter of the tapered surface 132 increases as it extends to the right as viewed in the drawing figures until it merges with a fourth flat annular surface 134. Immediately to the right of the fourth flat annular surface 134 is a third flat annular ridge 136 projecting toward the center axis of the tubular member 124 and the female coupler 102 and forming a radially extending annular wall 138 between the flat annular surface 134 and the flat annular ridge 136. The flat annular ridge 136 extends to the right and terminates at the distal end 104 of the female connector 102.

The plurality of flat annular surfaces, tapered annular surfaces, and flat annular ridges formed in the interior of the female connector 102 give the connector a plurality of different interior diameter dimensions. Each of the different diameter dimensions are designed to mate with one of the exterior diameter dimensions of the male connector 44. For example, the interior diameter of the first flat annular surface 108 of the female connector 102 is dimensioned to fit around the exterior diameter of the flat annular surface 78 of the male connector 44 when the two connectors are press-fit together. The dimensions of each of the mating interior and exterior surfaces of the female and male connectors, respectively, are chosen so that there is a limited tolerance between the opposed surfaces when the connectors are press-fit together. The tolerances between the interior surfaces of the female connector 102 and the exterior surfaces of the male connector 104 are taken up by a gasket material, for example RTV silicone rubber based gasket material, that is applied to the interior and exterior surfaces prior to the female and male connectors being press-fit together.

In connecting adjacent lengths of steel pipe by employing the method of the invention, the female and male connectors of the invention are first welded to the ends of the pipe to be connected in the positions shown in FIG. 3. This welding operation is intended to take place in a welding shop away from the pipelaying construction site where the welding can be done in the most efficient manner. Stockpiles of steel pipe having the male and female connectors of the present invention welded to their opposite ends are then transported to the pipeline construction site. At the construction site the lengths of pipe are inserted through a horizontal hole bored by conventional T.E.C. machinery and are advanced through the bore hole until only the distal end of the inserted pipe, with one of the connectors attached, projects from the hole. The next pipe is then positioned adjacent the pipe last inserted into the hole and the connector secured on the end of the next pipe is press-fit onto the connector of the last inserted pipe projecting from the hole by compression forces exerted by the T.E.C. equipment. Preferably, gasket material is applied to the exterior surface of the male connector and the interior surface of the female connector prior to their press-fit connection. When the female connector 102 has been press-fit over the male connector 44 to its further extent, the distal end surface 104 of the female connector abuts against the left end 32 of the tubular member connected to the male connector 44, and the distal end 46 of the male connector abuts against the right end 92 of the tubular member connected to the female connector. Continued axial movement of the female connector to the right as shown in the drawing figures will cause thrust or compression forces to be transmitted between the wall surfaces 104, 32 and the wall surfaces 92, 46, causing the connected lengths of pipe to be advanced through the bore hole.

With the female connector 102 connected over the male connector 44, the annular wall surfaces 118, 128, 138 of the female connector abut against the annular wall surfaces 74, 64, 54 of the male connector respectively. This engagement between these pairs of annular wall surfaces enables a pulling or tension force to be transmitted across the connector assembly. The axial widths of female connector annular ridges 116, 126, 136 and the axial widths of the male connector flat annular ridges 52, 62, 72 serve to strengthen the annular wall surfaces of the respective connectors against shearing or galling. This enables adjacent lengths of steel pipe connected by the female 102 and male 44 connectors to be pulled from the bore hole by tension forces exerted by the T.E.C. equipment should the hole boring machinery encounter some obstruction.

With the female connector 102 connected over the male connector 44, the flat annular surfaces 108, 114, 116, 124, 126, 134, 136 of the female connector 102 engage over the flat annular surfaces 78, 72, 68, 62, 58, 52, 48 of the male connector 44, respectively. This engagement of the flat annular surfaces of the female connector 102 over the flat annular surfaces of the male connector 44 enables the pipe connecting assembly of the present invention to transmit bending moments between adjacent lengths of steel pipe connected by the assembly. As can be seen in the drawing figures, the widths of the female connector and male connector between their interior and exterior surfaces are substantially equal to avoid splitting of the connectors as they are press-fit together and to enhance the ability of these connectors to transmit bending moments across the connector assembly.

Furthermore, the disclosure of welding the more precision invention to a less dimensionally precise steel pipe is only one embodiment of the invention. It should be understood that a further embodiment of the invention in which the same male and female connectors are formed directly on opposite ends of lengths of steel pipe to be used in press fitting those lengths of steel pipe together falls within the intended scope of the invention defined by the claims.

While the present invention has been described by reference to a specific embodiment, it should be understood that modifications and variations of the invention, for example varying the number of flat and tapered ridges and flat and tapered surfaces of the connectors, may be constructed without departing from the scope of the invention defined in the following claims.

What is claimed is:

1. A pipe connecting assembly for joining two lengths of steel pipe, the connecting assembly comprising:

first and second steel tubular members both having opposite ends and cylindrical exterior surfaces with substantially equal exterior diameters and both having cylindrical interior surfaces extending through the members between their opposite ends with substantially equal interior diameters;

a tubular male connector formed on one end of the first tubular member and extending coaxially from the member to a distal end of the connector, the male connector having an exterior surface with a plurality of annular tapered ridges formed thereon, each tapered ridge extending radially outwardly from the connector from a small diameter of the tapered ridge to a large diameter of the tapered ridge, and a plurality of flat annular surfaces formed on the male connector parallel to the center axis of the male connector with each flat annular surface positioned adjacent a tapered ridge and each flat annular surface having a diameter, where the large diameters of the plurality of tapered ridges become progressively larger as the exterior surface of the male connector extends from the distal end of the male connector toward the first tubular member and the diameters of the plurality of flat annular surfaces become progressively larger as the exterior surface of the male connector extends from the distal end of the male connector toward the first tubular member, the ridges giving the male connector a plurality of different exterior diameters all of which are smaller than the exterior diameter of the first tubular member, the exterior diameter of the male connector at the distal end of the connector being the smallest of the plurality of exterior diameters;

a tubular female connector formed on one end of the second tubular member and extending coaxially from the second member to a distal end of the female connector, the female connector having an interior surface with a plurality of annular tapered ridges formed thereon, each tapered ridge extending radially inwardly from the connector from a small diameter of the tapered ridge to a large diameter of the tapered ridge, and a plurality of flat annular surfaces formed on the female connector parallel to the center axis of the female connector with each flat annular surface positioned adjacent a tapered ridge and each flat annular surface having a diameter, where the large diameters of the plurality of tapered ridges become progressively smaller as the interior surface of the female connector extends from the distal end of the female connector toward the second tubular member and the diameters of the plurality of flat annular surfaces become progressively smaller as the interior surface of the female connector extends from the distal end of the female connector toward the second tubular member, the ridges giving the female connector a plurality of different interior diameters all of which are larger than the interior diameter of the second tubular member, wherein the male connector is insertable into the female connector to form a press-fit connection between the first and second tubular members with the tapered ridges and flat annular surfaces of said male and female connectors interengaged so that said connection is capable of transmitting compression forces, tension forces and bending moments across the press-fit connection.

2. The connecting assembly of claim 1, wherein: the first and second tubular members are both lengths of steel pipe.

3. The connecting assembly of claim 1, wherein:
ends of both the first and second tubular members opposite from the one ends of the members having the male and female connectors, respectively, formed thereon are configured to be welded to an end of a length of steel pipe.

4. The connecting assembly of claim 1, wherein:
adjacent flat annular surfaces formed on the exterior surface of the male connector between adjacent tapered ridges are separated by an annular wall formed on the exterior surface that extends radially between the adjacent flat annular surfaces perpendicular to the center axis.

5. The connecting assembly of claim 1, wherein:
a flat annular ridge is formed on the interior surface of the female connector adjacent the distal end of the female connector, and a radial thickness of the distal end of the female connector is substantially equal to a radial thickness of the distal end of the male connector.

6. The connector assembly of claim 1, wherein:
the plurality of ridges formed on the exterior surface of the male connector are separated by at least one annular wall formed perpendicular to the male connector center axis on the exterior surface extending radially between adjacent ridges and the plurality of ridges formed on the interior surface of the female connector are separated by at least one annular wall formed perpendicular to the female connector center axis on the interior surface extending radially between adjacent ridges, wherein the male connector is insertable into the female connector to form a press-fit connection between the first and second tubular members with the annular wall of the male connector opposing the annular wall of the female connector to transmit tension forces across the press-fit connection without creating a radial component of the tension forces.

7. The connecting assembly of claim 1, wherein:
a gasket material is applied to the exterior surface of the male connector and the interior surface of the female connector and provides a seal in the press-fit connection between the first and second tubular members.

8. In a method of excavation pipelaying of adjacent lengths of metal pipe of the type wherein the lengths of pipe are conventionally welded together generally horizontally and coaxially, end-to-end, at a pipelaying site, an improvement eliminating the step of welding the lengths of pipe at the pipelaying site in order to connect the lengths of pipe, the improvement comprising:

forming first and second tubular members of steel with each member having opposite ends and each member having cylindrical exterior and interior surfaces with diameters that substantially conform to exterior and interior diameters of the steel pipe to be connected;

forming a tubular male connector on one end of the first tubular member with the male connector having an exterior surface with a plurality of annular tapered ridges having surfaces parallel to a center axis of the male connector and a plurality of flat surfaces parallel to the center axis of the male connector formed thereon forming each flat surface of the plurality of flat surfaces with a different diameter and with the diameters of the plurality of flat surfaces becoming progressively larger as the exterior surface of the male connector extends from a distal end of the male connector toward the first tubular member, and forming each annular ridge of the plurality of annular ridges with a different diameter greater than the diameter of the adjacent flat surfaces and with the diameters of the plurality of annular ridges becoming progressively larger as the exterior surface of the male connector extends from the distal end of the male connector toward the first tubular member;

at a site remote from the pipelaying site, welding an end of the first tubular member opposite the male connector to an end of one of the two lengths of steel pipe so that a cylindrical interior surface and a cylindrical exterior surface of the one length of pipe are continuous with the cylindrical interior and exterior surfaces, respectively, of the male connector;

forming a tubular female connector on one end of the second tubular member with the female connector having an interior surface with a plurality of annular tapered ridges having surfaces parallel to a center axis of the female connector and a plurality of flat surfaces parallel to the center axis of the female connector formed thereon, forming each flat surface of the plurality of flat surfaces with a different diameter and with the diameters of the plurality of flat surfaces becoming progressively smaller as the interior surface of the female connector extends from a distal end of the female connector toward the second tubular member, and forming each annular ridge of the plurality of annular ridges with a different diameter smaller than the diameter of the adjacent flat surfaces and with the diameters of the plurality of annular ridges becoming progressively smaller as the interior surface of the female connector extends from the distal end of the connector toward the second tubular member;

at the remote site from the pipelaying site, welding an end of the second tubular member opposite the female connector to an end of a second of the two lengths of steel pipe so that a cylindrical interior surface and a cylindrical exterior surface of the second length of pipe are continuous with the cylindrical interior and exterior surfaces, respectively, of the female connector; transporting the one and second lengths of pipe from the remote site to the pipe laying site; and, press fitting the male connector into the female connector at the pipelaying site with the tapered ridges and flat annular surfaces of said male and female connectors interengaged to thereby join the two lengths of steel pipe together at the pipelaying site while eliminating the step of welding the lengths of pipe at the pipelaying site.

9. The method of claim 8, including:

forming the plurality of annular ridges on the exterior surface of the male connector with an annular ridge adjacent the distal end of the male connector from the first tubular member having a smaller diameter than the diameters of the other annular ridges.

10. The method of claim 8, including:

forming the plurality of annular ridges on the interior surface of the female connector with an annular ridge adjacent a distal end of the female connector from the first tubular member having a larger diameter than the diameters of the other annular ridges.

11. The method of claim 8, including:

applying a gasket material to the exterior surface of the male connector and the interior surface of the female connector prior to their being press-fit together.

12. The improvement of claim 8, wherein:

the method of pipelaying is trenchless excavation pipelaying and the method includes advancing the lengths of pipe connected at the pipelaying site by the male and female connects through a generally horizontally bored hole by axially directed forces exerted on the connected lengths of pipe.

13. In combination with at least two adjacent lengths of metal pipe of the type wherein the lengths of pipe are conventionally welded together generally horizontally, end-to-end, at a pipelaying site in both trenching pipelaying and in trenchless pipelaying, an improvement eliminating the welding of the lengths of pipe at the pipelaying site in order to join the lengths of pipe, the improvement comprising:

the two adjacent coaxial lengths of metal pipe have cylindrical exterior surfaces with substantially equal exterior diameters and the two adjacent lengths of metal pipe have cylindrical interior surfaces with substantially equal interior diameters;

one of the two adjacent lengths of metal pipe has a tubular male connector provided on one end of the one length of pipe, the tubular male connector has a center axis and extends coaxially from the one length of pipe to a distal end of the male connector, the male connector has a cylindrical interior surface with an interior diameter substantially equal to the interior diameters of the two lengths of pipe, the male connector has a cylindrical exterior surface with an exterior diameter substantially equal to the exterior diameters of the two lengths of pipe, the exterior surface of the male connector has an annular end wall formed therein spaced axially from the distal end of the male connector, the annular end wall extends radially from the exterior surface of the male connector toward the center axis of the male connector and is perpendicular to the center axis, extending axially from the annular end wall to the distal end of the male connector the exterior surface is formed with a plurality of sequences of four exterior surface configurations, each sequence including a flat annular surface that extends parallel to the male connector center axis, then a flat annular wall that extends from the flat annular surface perpendicular to the connector center axis, then a flat annular ridge that extends from the flat annular wall substantially parallel to the connector center axis, and then a tapered annular ridge that extends from the flat annular ridge and tapers toward the connector center axis, and then the sequence of surface configurations repeats for each sequence of the plurality of sequences with a diameter of the flat annular surface and a diameter of the flat annular ridge of each sequence becoming progressively smaller as the sequences repeat, and the plurality of sequences end at a flat annular end surface at the distal end of the male connector, the flat annular end surface having the smallest exterior diameter on the male connector;

a second of the two adjacent lengths of metal pipe has a tubular female connector provided on one end of the second length of pipe, the tubular female connector has a center axis and extends coaxially from the second length of pipe to a distal end of the female connector, the female connector has a cylindrical interior surface with an interior diameter substantially equal to the interior diameters of the two lengths of pipe, the female connector has a cylindrical exterior surface with an exterior diameter substantially equal to the exterior diameters of the two lengths of pipe, the interior surface of the female connector has an annular end wall formed therein spaced axially from the distal end of the female connector, the annular end wall extends radially from the interior surface of the female connector away from the center axis of the female connector and is substantially perpendicular to the center axis, extending axially from the annular end wall toward the distal end of the female connector is a flat interior annular surface that extends substantially parallel to the female connector center axis, and extending axially from the flat annular surface to the distal end of the female connector the interior surface is formed with a plurality of sequences of four interior surface configurations, each sequence including a tapered annular surface that tapers away from the center axis of the female connector, then a flat annular surface that extends from the tapered annular surface parallel to the female connector center axis, then a flat annular wall that extends from the flat annular surface perpendicular to the female connector center axis, and then a flat annular ridge that extends from the flat annular wall parallel to the female connector center axis, and then the sequence of interior surface configurations repeats for each sequence of the plurality of sequences with a diameter of the flat annular surface and a diameter of the flat annular ridge of each sequence becoming progressively larger as the sequences repeat, and the plurality of sequences end at the distal end of the female connector; wherein, the male connector is inserted into the female connector forming a press-fit connection between the two adjacent lengths of metal pipe with the ridges and flat annular surfaces of said male and female connectors interengaged so that said connection is capable of transmitting axially directed forces across the press-fit connection.

14. The improvement of claim 13, wherein:
the flat annular wall in each of the plurality of sequences of exterior surface configurations on the male connector and the flat annular wall in each of the plurality of sequences of interior surface configurations on the female connector provide means for transmitting axially directed forces across the press-fit connection without producing a radially directed component of the forces.

15. The improvement of claim 13, wherein:
a radial width of the distal end of the female connector is substantially equal to a radial width of the distal end of the male connector thereby enabling the female connector to expand and the male connector to contract, both within elastic limits of the connectors, in the press-fit connection.

16. The improvement of claim 13, wherein:
the cylindrical interior surface of the two lengths of pipe and the male and female connectors forming the press-fit connection between the lengths of pipe are substantially continuous with no obstructions and the cylindrical exterior surfaces of the two lengths of pipe and the male and female connectors forming the press-fit connection between the lengths of pipe are substantially continuous with no obstructions.

17. The improvement of claim 13, wherein:
the flat interior annular surface extending axially from the annular end wall of the female connector has an interior diameter that is smaller than interior diameters of the interior surface configurations of each of the plurality of sequences of interior surface configurations.

18. The improvement of claim 13, wherein:
the male connector has been welded to the end of the one length of pipe and the female connector has been welded to the end of the second length of pipe.

19. The improvement of claim 13, wherein:
the male connector has been formed integrally on the end of the one length of pipe and the female connector has been formed integrally on the end of the second length of pipe.

* * * * *